United States Patent [19]

Juels

[11] 3,857,097

[45] Dec. 24, 1974

[54] COMPENSATING TECHNIQUES FOR SENSITIVE WIDE BAND VOLTMETERS

[75] Inventor: Ronald J. Juels, Freeport, N.Y.

[73] Assignee: Comstron Corporation, Richmond Hill, N.Y.

[22] Filed: July 16, 1973

[21] Appl. No.: 379,582

[52] U.S. Cl. .................. 324/132, 324/120, 328/162
[51] Int. Cl. ....................... G01r 15/10, G01r 19/26
[58] Field of Search ......... 324/120, 132, 121, 77 A, 324/77 C; 328/162, 163; 307/230

[56] References Cited

UNITED STATES PATENTS

| | | | |
|---|---|---|---|
| 2,710,397 | 6/1955 | Foster | 324/132 |
| 3,196,348 | 7/1965 | Parker | 324/120 |
| 3,383,594 | 5/1968 | Fiorletta et al. | 324/121 |

*Primary Examiner*—Alfred E. Smith
*Assistant Examiner*—Ernest F. Karlsen
*Attorney, Agent, or Firm*—Arthur L. Plevy

[57] ABSTRACT

A wide band voltmeter is capable of measuring the amplitude of AC signals over large ranges of frequency and amplitude. Such a voltmeter uses a mixer which has an input circuit channel that receives the AC signal and another input which receives a signal from a swept oscillator whose frequency is varied by a sawtooth generator to determine the range of magnitude of the input frequency to the mixer. This enables wide band operation of the voltmeter with increased accuracy. The mixer has a conversion efficiency which is dependent upon frequency, this dependency is also true of the input circuitry associated with the AC input to the mixer.

In order to compensate for this dependency and to assure that all frequencies are treated equally, a series of theshold devices monitor the sawtooth or sweep waveform and provide a control signal, which signal is used to substantially compensate for the frequency dependency of the mixer and associated input circuitry to therefore enable the provision of a proper indication of the magnitude of the AC signal relatively independent of frequency.

10 Claims, 1 Drawing Figure

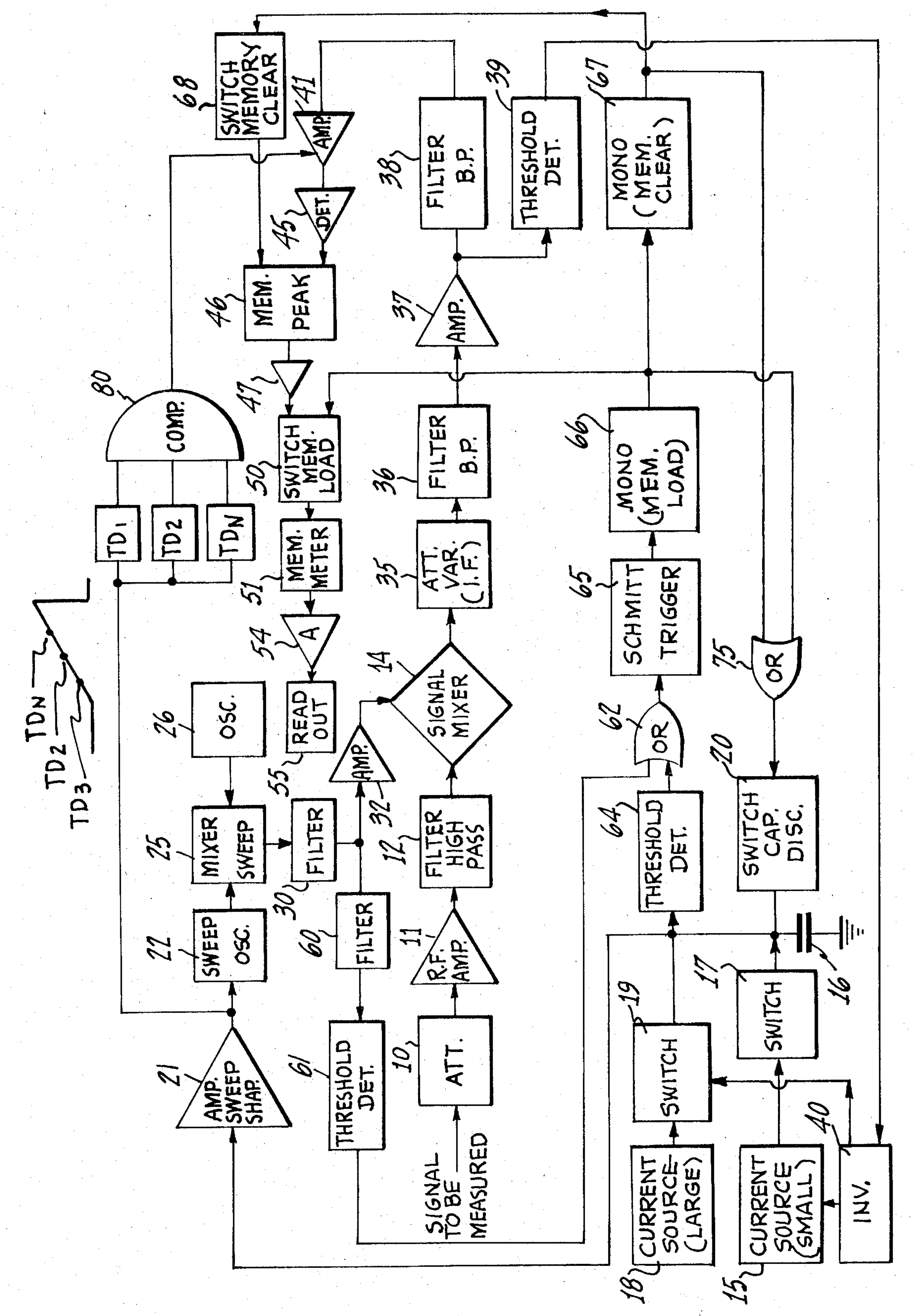
SWITCH MEMORY CLEAR
AMP.
DET.
FILTER B.P.
THRESHOLD DET.
MONO (MEM. CLEAR)
MEM. PEAK
AMP.
COMP.
SWITCH MEM. LOAD
FILTER B.P.
MONO (MEM. LOAD)
TD1
TD2
TDN
MEM. METER
ATT. VAR. (I.F.)
SCHMITT TRIGGER
A
SIGNAL MIXER
OR
TDN
TD2
TD3
OSC.
READ OUT
AMP.
OR
MIXER SWEEP
FILTER
FILTER HIGH PASS
THRESHOLD DET.
SWITCH CAP. DISC.
SWEEP OSC.
FILTER
R.F. AMP.
SWITCH
SWITCH
AMP. SWEEP SHAP.
THRESHOLD DET.
ATT.
SIGNAL TO BE MEASURED
CURRENT SOURCE (LARGE)
CURRENT SOURCE (SMALL)
INV.

COMPENSATING TECHNIQUES FOR SENSITIVE WIDE BAND VOLTMETERS

This invention relates to signal amplitude measuring apparatus and more particularly to compensating techniques useful in conjunction with such apparatus for performing extremely accurate measurements over a wide range of frequencies.

BACKGROUND OF INVENTION

Presently, there exists a number of instruments or apparatus which depend upon the up-conversion or down-conversion of the frequency of a signal, which signal is thereafter processed or operated on.

Essentially, these devices use mixers to perform the conversion process. In many instances, the conversion constancy of the mixer is not of extreme importance and in other instances it is.

In a device which measures the amplitude of an AC signal, the conversion constancy of a mixer is of extreme importance. For example, in a radio frequency (RF) voltmeter, if the signal to be measured were down converted to a lower frequency, the mixer would have to perform the conversion linearly in amplitude as the main function of a voltmeter is to give the user an accurate indication of voltage magnitude.

As one increases the range of frequencies that the voltmeter is to operate over, one places more stringent conditions on the mixer. As is well known in the prior art, a mixer, a modulator, or for that matter most circuits, including amplifiers, are frequency dependent. That is, the conversion efficiency of a mixer is a function of the frequency it is operating at. Therefore, a mixer has a frequency-gain or frequency-amplitude characteristic associated with it. Generally, the conversion efficiency of a mixer decreases as the input frequency increases. This characteristic is analogous to the gain variation of an amplifier with increasing frequency.

The input circuit to a mixer may also include an attenuator, a probe, a pre-amplifier and other amplifying circuitry as well. These may exhibit amplitude dependence with frequency. This becomes a severe problem in a voltmeter or similar instrument as the intent is to provide a user with an accurate and correct indication of signal magnitude. If the signal is not processed accurately by the instrument, the reading cannot be correct.

This problem is further complicated by a desire to operate the instrument over as wide a range of frequencies as possible.

To compensate each amplifier, probe and mixer as well as to provide compensation for each frequency and so on is an unduly expensive and difficult task. It is therefore desireable to provide compensation as inexpensively as possible while maintaining accuracy and reliability of the measuring apparatus.

Hence, as the range of a RF voltmeter using frequency conversion techniques is increased, one can anticipate a variation in the operating characteristics of mixers, probes and amplifiers. These characteristics vary, generally, at the high frequency end of the instrument's operating range.

It is therefore an object of the present invention to provide a compensating technique for use in conjunction with a radio frequency voltmeter whose characteristics undesirably vary over a given range of frequencies.

BRIEF DESCRIPTION OF FIGURES

The sole FIGURE is a detailed block diagram of a RF voltmeter employing compensating apparatus according to this invention.

DESCRIPTION OF PREFERRED EMBODIMENT

There is disclosed apparatus for measuring the amplitude of an AC signal of the type including a mixing circuit having first and second inputs, said first input adapted to receive said AC signal and a second input adapted to receive a signal from a variable oscillator. Said oscillator having a control terminal for application of a sawtooth voltage to said control terminal to vary the frequency to provide at the output of said mixing circuit a difference signal frequency indicative of the difference in frequency between the AC signal and the oscillator signal. The mixing circuit undesirably providing a non-constant amplitude output for AC frequency signals within a predetermined range. To compensate for said non-constant conversion efficiency, there is in combination therewith a level detecting means responsive to said sawtooth voltage for providing a control signal when said sawtooth is at a level manifesting a non-linear mixing operation and also means coupled to said mixing circuit and responsive to said control signal to substantially compensate for said non-linearity.

DETAILED DESCRIPTION OF FIGURE

Referring to the figure, there is shown a block diagram of a RF voltmeter which is capable of measuring the amplitude of an AC signal over a wide range of frequencies and amplitude, and is further capable of responding to relatively low amplitude signals. The voltmeter is the subject matter of a co-pending application entitled "SENSITIVE WIDEBAND VOLTMETERS", filed on Apr. 12, 1972 as Ser. No. 243,224 by Philip Basse and assigned to the assignee herein. The method of operation of the instrument is clearly set forth in the above patent application but will be reiterated herein for the sake of clarity.

An unknown AC signal which may be at a relatively high frequency is applied to an input terminal of a variable attenuator 10. The attenuator 10 is a stepped attenuator wherein the input signal is selectively attenuated according to a fixed decibel or other level.

The output of the attenuator 10 is coupled to the input of a RF amplifier 11. The amplifier 11 provides isolation and may further serve to provide a current or voltage gain of a fixed magnitude to the RF signal available at the output of amplifier 11, which signal is the signal whose amplitude is to be measured. The output of the amplifier 11 is coupled to a high pass filter 12 which serves to limit the range of the voltmeter and to prevent spurious frequencies from being applied to the signal mixer 14.

The above description therefore specifies the signal path for the signal to be measured.

The signal mixer 14 is the mixer or down-convertor whose characteristics undesirably vary over the frequency range as described above. Basically, the mixer 14 provides a down-conversion in frequency for the input signal to enable one to obtain an accurate indication of the magnitude of the input signal. As one can see, if the mixer 14 had a frequency dependent conversion efficiency, the output would be frequency defendent and hence the voltmeter would not indicate the correct value via the readout 55.

The problem becomes of greater concern as the range of frequencies to be measured is increased. As is known, the larger the frequency range that the mixer 14 has to accommodate, the more difficult it is to obtain linear operation.

While the signal mixer 14 is certainly a source of amplitude loss and non-linearity, it can be seen that such frequency versus amplitude characteristics which exist in the input circuit also affect the reading and accuracy of the voltmeter.

For example, if the attenuator 10, RF amplifier 11 or filter 12 exhibitied non-linear response or a frequency dependent response, the accuracy of the instrument would also be affected. Similarly, if a probe were utilized and such a probe exhibited a frequency dependency characteristic, there would be a further problem which would have to be compensated for.

The other terminal of the mixer 14 has a reference signal applied thereto, which signal is generated by a swept oscillator circuit combined with a fixed frequency oscillator signal. A sweep circuit or sawtooth generator includes a constant current source 15 (small) for changing a capacitor 16 via a switching circuit 17 during one mode. A second constant current source 18 (large) charges capacitor 16 via a switch 19. Thus, a sweep waveform is developed across capacitor 16, which sweep has a slope depending upon whether it is charged from current source 15 or 18.

The sweep waveform is applied to amplifier 21 and thence via amplifier 21 to the control input of a sweep oscillator 22. Accordingly, the sweep waveform varies the frequency of the oscillator 22 over a predetermined range. The sweep oscillator signal is applied to one input of a sweep mixer 25. The other input of mixer 25 is furnished from a fixed frequency oscillator 26. The output of the mixer contains the sum and difference products of the input signals. The difference or lower products are selected via filter 30 and applied via amplifier 32 to the other input of the signal mixer 14.

The output from mixer 14 is applied to an attenuator 35, which is a variable attenuator similar to the attenuator 10 but operative at a lower frequency. The output of the attenuator 35 is coupled to a bandpass filter 36. The bandpass filter 36 functions as an intermediate frequency (IF) stage and operates to select any one of a range of frequencies within a predetermined low frequency range. Thus, when the difference in frequency between the input signal via amplifier 11 and the signal via amplifier 32 is within the bandpass of filter 36, an output signal is provided. This signal is applied to an isolation amplifier 37. The output from the amplifier 37 is coupled to the input of still another bandpass filter 38, having a narrower bandpass than filter 36, and to the input of a threshold detector or sweep rate detector 39. It is the sweep rate threshold detector 39, as will be explained, that controls the charging of the sweep capacitor 16 via switches 17 and 19. Hence, the output of the theshold detctor 39 is coupled to the switch 19 associated with current source 18 and to switch 17 associated with current source 15 via an inverter 40. The threshold detector 39 may be a differential amplifier configuration or another typical threshold detection circuit, many examples of which exist in the prior art.

The output of the bandpass filter 38 is coupled to the input of a detector circuit 45 via a gain controlable amplifier 41. The detector circuit 45 serves to convert the AC signal at its input to a DC signal at its output. Detector 45 may be an operational amplifier detector configuration, to provide good linearity and due to other characteristics, better sensitivity.

The output of the operational detector circuit 45 is coupled to a peak memory storage circuit 46. The funcition of the storage circuit 46 is to store the DC output of the detector 45 representative of the peak amplitude AC applied to the detector 45. The memory 46 may be a field effect storage circuit or a typical capacitor store transistor circuit. Many memory circuits for doing this are known in the art.

The output of the memory 46 is applied to a buffer amplifier 47. The buffer amplifier 47 has the output terminal coupled to the input of a memory load switch circuit 50. The output of the switch 50 is coupled to another memory circuit 51. The function of memory 51 is to supply a signal to a readout device 55 via amplifier 54. The readout device 55 may be a conventional d'Arsonval DC meter that requires a current of the order of 0.1 to 1.0 MA to produce full-scale deflection, or may be a digital readout device. Many suitable meters are known and available.

Both memories 46 and 50 are controlled according to the status of the mixer circuits and the sweep signals by the following logic circuitry:

Coupled to the low pass filter 30 is another low pass filter 60 having a narrow bandpass than filter 30. The output of filter 60 is applied via a sweep cutoff threshold detector 51 to an input of an OR gate 62. Another input to OR gate 62 is supplied via another detector 64 having an input coupled to capacitor 16. The output of OR gate 62 is applied to the input of a Schmitt trigger circuit 65. The output of the Schmitt trigger 65 is applied to the memory load switch 50 via a monostable multivibrator 66 or one-shot 66. The output of the monostable 66 is applied to another monostable 67 which multivibrator controls the operation of the peak storage memory 46 via a memory clear switch 68.

The output of both monostables 66 and 67 are applied to respective inputs or an OR gate 75 whose output is used to control the sweep switch discharge circuit 20.

OPERATION OF THE VOLTMETER

Assume that the signal to be measured is of a frequency of 10,000,000 cycles per second or 10 MHZ. It is noted at the onset that the frequency is only typical as are the other frequency values to be described herein, and the unit can operate over a plurality of different frequency ranges by changing parameters herein, but by using the basic apparatus provided by this invention.

Initially, the current source (large) 18 is coupled to the capacitor 16 and causes a ramp to be developed thereacross. This ramp is applied to a control input of oscillator 22 whose frequency is swept upward from, in this example, 190 to 300 MHZ due to the application of the ramp to a variable reactance device. The filter 30 passes only the difference frequency or the lower frequency product which is in the range of 0 to 110 MHZ. The difference frequency being determined by the difference between the frequency of oscillator 22 and oscillator 26. This frequency is applied to mixer 14 via amplifier 32.

The sweep oscillator starts at the low frequency end of 190 MHZ and is being swept upward. If the sweep oscillator commences operation at 190 MHZ, the output of mixer 30 will be 110 MHZ, as the frequency of oscillator 22 is raised, the mixer 30 provides an output which appreaches the frequency of 10MHZ. Therefore, oscillator 22 is swept upward while the output of mixer 25 goes down in frequency accordingly.

When the oscillator 22 is at a frequency of 289.950 MHZ, the low product output of mixer 25 is 10.05 MHZ and is passed through filter 30 and applied to mixer 14. Therefore, the difference output from mixer 14 is 50,000 HZ. This signal at the output of amplifier 37 serves to activate the sweep rate threshold detector 39.

The activation of the sweep rate detector 39 inhibits the current source (large) 18 from charging capacitor 16 and simultaneously enables current source 15 (small) via switch 17 and inventer 40 to thereby charge capacitor 15 at a slower rate.

As the oscillator 22 continues to sweep upward at the lower rate, the filter 38 will also begin to pass signals and these signals are detected by detector 45 and stored in the memory 46. Memory 46 stores the largest peak value occurring within the bandpass of filter 38. As oscillator 22 is swept from 289.95 KHZ towards 289.98 MHZ, the output of mixer 14 goes from 50 KHZ to 20 KHZ. This (20 KHZ) specifies a frequency within the bandpass of filter 38. As the frequency of oscillator 22 is raised at the slow rate, the output signal of mixer 14 decreases in frequency unitl oscillator 22 is at 290 MHZ, indicating a zero frequency output of mixer 14. Before this frequency, however, (at 1,000 HZ) the bandpass filters 36 and 38 do not pass any further signals. The detector 39 is released causing the sweep rate to change back to the large current source control. As soon as the oscillator 22 frequency increases to 299.90 MHZ, the filter 60 and threshold detector 61 operate. The sweep cut-off detector 61 then activates the Schmitt trigger 65 via the OR gate 62. Activation of the Schmitt trigger 65 causes the monostable 66 to trigger. This triggering of the monstable 66 serves to rapidly discharge capacitor 16 via discharge circuit 20 and to further inhibit charging of the capacitor 16 during the duration of the pulse afforded by one shot 66. This therfore prevents the oscillator 22 from being swept. The one shot 66 also enables the memory load switch 50 thus transferring the information stored in peak memory 46 to the meter memory 51, to thereby provide a reading of the voltage detected due to the 10 MHZ input signal.

At the termination of the period provided by the monostable 66, the monostable 67 is triggered. This also inhibits charging of capacitor 16 through the action of OR gate 75, as above described, and further removes all information stored in memory 46 by activating the memory clear switch 68.

At the termination of the period provided by monostable 67, the sweep circuit is again enabled and another detection cycle, as above described, commences.

Thus, at the end of the cycle, the output detected via detector 45 is stored and is a linear function of the largest spectral component of the input signal. It is this component that is indicated and provided as a reading via the readout 55 which may be a digital or analog type device.

OPERATION OF THE COMPENSATING CIRCUITRY

As described above, it is clearly seen that as the frequency of oscillator 22 is swept upwards, the bandpass circuits 36 and 38 are activated due to the fact that the difference signal from mixer 14 is becoming lower and lower.

In any event, mixer 14 was responding to an input signal via amplifier 11 of 10 MHZ. This signal could have been 20 MHZ or higher. The mixer 14 would be receiving higher frequency signals at the other input corresponding to or associated with amplifier 32. Conversion efficiency of mixer 14 is important as the signal stored by memory 46 is determined by the mixer output. Therefore, if the mixer output varies with frequency, the reading of the voltmeter would also vary and therefore fail to provide a correct indication of amplitude.

It is therefore apparent that one has to compensate for this mixer characteristic.

Since one is not concerned with the frequency of the input signal, where to compensate becomes difficult. One can perhaps compensate at filter 12, but at great expense as the filter is an RF filter.

In any event, it is clearly understood that the sweep waveform emanating from capacitor 16 and amplified by amplifier 21 is determinative of the frequency of the signal to be measured.

As indicated above, the sweep circuit determines the frequency of oscillator 22 which in turn determines the output of filter 30 via mixer 25 and hence the output of mixer 14.

Thus, by monitoring the magnitude of the sawtooth voltage via amplifier 21, one knows when the mixer 14 is approaching the upper frequency limits or when the mixer is approaching an area of non-linear operation. This has to be true whether or not a signal is being measured.

Thus, one can now perform compensation extremely inexpensive. As is seen from the figure, a series of theshold detectors designated respectively as TD 1, TD 2 and TD N, all having inputs coupled to the output of amplifier 21. The threshold detectors may be conventional comparators, Schmitt triggers, flip flops and so on and are inexpensive to purchase as such devices exist in the integrated circuit art.

The function of each threshold detector is to respond to a given amplitude of sawtooth voltage (see figure) to provide an output. Thus, TD 1 responds at a different level than TD 2 and so on. The number of threshold detectors can be varied according to the correction needed and dependent upon the fall-off or characteristics of the mixer 14. The output of the threshold detectors are combined in a gate circuit 80 which may be an operational amplifier, a conventional amplifier or conventional diode gate.

The output of the combiner 80 is applied to the control terminal of amplifier 41 to vary the gain thereof in accordance with the composite threshold detector signal. As is understood, the output from combiner 80 can be tailored to provide a relatively good compensating characteristic. Inherently, the gain of amplifier 41 is varied according to the composite control signal from combiner 80 so as to completely compensate for the non-linearily of mixer 14. The compensation could also be applied to amplifier 37 to therefore vary its gain in lieu of amplifier 41. In any event, the advantages of the above compensating technique are apparent in that inexpensive circuitry is used and the frequency operation is low even though one is performing high frequency compensation. For example, the threshold detectors are DC responsive to a relatively low frequency sawtooth. The output of the combiner is applied to low frequency responsive amplifier as 37 or 41 and yet one can compensate for very high frequency non-linearity of mixer 14 or of any device prior to the signal input terminal of mixer 14, such as the filter, RF amplifier or attenuator.

It can also be easily ascertained and seen that in such an instrument, due to the wide range of frequencies to be accommodated, one might necessarily require a number of different ranges over which the instrument operates. Each of these ranges might be associated with a separate attenuator, amplifier or filter.

Therefore, one would have to compensate for this effect. In this instance, a memory such as a ROM (read only memory) may be programmed to initially provide the compensating factor for the range selected to operate in conjunction with the sawtooth threshold detectors so that the correct factor of compensation is applied to the instrument to achieve linear operation.

I claim:

1. In apparatus for measuring the amplitude of an AC signal of the type including a sweep circuit for providing a sweep waveform, a variable frequency oscillator responsive to said sweep waveform for varying its output frequency, an input channel, including a mixer and responsive to said AC signal and said oscillator signal for providing a difference frequency signal therefrom, said apparatus including means for responding to said difference signal to provide an indication of the magnitude of said AC signal, said input channel undesirably operating non-linearly as a function of the frequency of said AC signal, the improvement therewith of apparatus for compensating for said non-linearity, comprising:

a. a plurality of threshold detectors responsive to said sweep waveform for providing at an output a series of control signals when said sweep voltage is at a level manifesting a range of non-linear input channel operation, and b. combining means coupled to said means for responding to said difference signals and responsive to said control signals for providing a composite signal for varying the characteristics of said means in a direction to compensate for said non-linearity.

2. The apparatus according to claim 1 wherein said input channel further includes an amplifier having an input responsive to said AC signal and an output coupled to an input of said mixer.

3. In apparatus for measuring the amplitude of an AC signal of the type including a sweep circuit for providing a sweep waveform, a variable frequency oscillator responsive to said sweep waveform for varying its output frequency, a mixer responsive to said AC signal and said oscillator signal for providing a difference frequency signal therefrom, said apparatus including means for responding to said difference signal to provide an indication of the magnitude of said AC signal, said mixer undesirably operating non-linearly as the frequency of said AC signal increases, the improvement therewith of apparatus for compensating for said nonlinearity, comprising:

a. a plurality of threshold detectors responsive to said sweep waveform for providing at an output a series of control signals when said sweep voltage is at a level manifesting a range of non-linear mixer operation, and b. combining means coupled to said means for responding to said difference signals and responsive to said control signals for providing a composite signal for varying the characteristics of said means in a direction to compensate for said mixer non-linearity.

4. In apparatus for measuring the amplitude of an AC signal of the type including a mixing circuit having first and second inputs, said first input adapted to receive said AC signal and a second input adapted to receive a signal from a variable oscillator, said oscillator having a control terminal for application of a sawtooth voltage to said control terminal to vary the frequency to provide at the output of said mixing circuit a difference signal frequency indicative of the difference in frequency between the AC signal and the oscillator signal, said mixing circuit undesirably providing a non-linear output for AC frequency signals within a predetermined range, in combination therewith the improvement of apparatus for compensating for said mixing non-linearity comprising:

a. level detecting means responsive to said sawtooth voltage for providing a contol signal when said sawtooth is at a level manifesting a non-linear mixing operation, and b. means coupled to said mixing circuit and responsive to said control signal to substantially compensate for said non-linearity.

5. Apparatus for measuring the amplitude of an AC signal comprising:

a. a frequency modulatable oscillator having an output terminal and a control input terminal for application thereto of a sweep voltage for varying the frequency at said output terminal over a predetermined range, b. means for providing a sweep voltage at an output terminal, said output terminal coupled to said control input terminal of said oscillator for varying the frequency thereof, c. mixing means coupled to said oscillator and responsive to said AC signal to provide at an output a mixing product signal having an amplitude indicative of said AC signal, said mixing means undesirably providing non-linear operation for a predetermined range of said AC signal frequency, d. processing means responsive to the termination of said sweep voltage waveform to store the magnitude of said mixing product signal and therfore of said AC signal, whereby certain of said magnitudes, as stored, are incorrect due to said non-linearity, e. threshold means coupled to said output terminal of said means for providing a sweep voltage for providing a composite control signal when said sweep voltage is at a level manifesting said predetermined range of frequencies, and f. means responsive to said control signal to apply said signal to said processing means to vary the magnitude of said signal stored according to said control signal to substantially eliminate said non-linearity.

6. The apparatus according to claim 5 wherin said threshold means include at least one Schmitt trigger having an input coupled to said output terminal of said means for providing a sweep voltage and an output terminal coupled to said means responsive to said control signal.

7. The apparatus according to claim 5 wherein said threshold means include a comparator circuit having one input coupled to said output terminal of said means for providing a sweep voltage and an output terminal coupled to said means responsive to said control signal.

8. In apparatus for measuring the amplitude of an AC signal of the type including a mixing circuit having first and second inputs, said first input adapted to receive said AC signal via amplifying means and a second input adapted to receive a signal from a variable oscillator, said oscillator having a control terminal for application of a sawtooth voltage to said control terminal to vary the frequency to provide at the output of said mixing circuit a difference signal frequency indicative of the difference in frequency between the AC signal and the oscillator signal, said mixing circuit and said amplifying means undesirably providing a non-linear output for AC frequency signals within a predetermined range, in combination therewith the improvemtnt of apparatus for compensating for said non-linearity comprising:

a. level detecting means responsive to said sawtooth voltage for providing a control signal when said sawtooth is at a level manifesting non-linear operation, and b. means coupled to said mixing means and responsive to said control signal to substantially compensate for said non-linearity.

9. The apparatus according to claim 8 wherein said level detecting means include Schmitt trigger circuits.

10. The apparatus according to claim 8 wherein said means coupled to said mixing means include a combiner circuit.

* * * * *